United States Patent [19]

Matson

[11] Patent Number: 4,633,986

[45] Date of Patent: Jan. 6, 1987

[54] CLUTCH/BRAKE APPARATUS

[75] Inventor: Robert C. Matson, Waukesha, Wis.

[73] Assignee: Industrial Clutch Corporation, Waukesha, Wis.

[21] Appl. No.: 648,321

[22] Filed: Sep. 7, 1984

[51] Int. Cl.$^4$ ............................................. F16D 67/04
[52] U.S. Cl. ................................................ 192/18 A
[58] Field of Search ................ 192/12 C, 18 A, 18 B, 192/18 R

[56] References Cited

U.S. PATENT DOCUMENTS

| | | | |
|---|---|---|---|
| 2,242,396 | 5/1941 | Johansen | 192/18 R |
| 3,209,872 | 10/1965 | Moyer et al. | 192/18 R |
| 3,638,773 | 2/1972 | Lewis et al. | 192/18 A |
| 3,667,581 | 6/1972 | Hanks | 192/18 A |
| 3,696,898 | 10/1972 | Sommer | 192/18 A |
| 3,713,517 | 1/1973 | Sommer | 192/18 A |
| 3,835,971 | 9/1974 | Spanke et al. | 192/18 A |
| 3,896,911 | 7/1975 | Benke | 192/18 A |
| 3,924,715 | 12/1975 | Cory | 192/18 A |
| 3,946,840 | 3/1976 | Sommer | 192/18 A |
| 4,116,322 | 9/1978 | Ashfield | 192/48 B |
| 4,122,926 | 10/1978 | Spanke et al. | 192/18 A |
| 4,135,611 | 1/1979 | Spanke | 192/18 A |
| 4,234,123 | 11/1980 | Cory | 233/23 R |
| 4,440,278 | 4/1984 | Weber | 192/18 R |
| 4,512,450 | 4/1985 | Babcock | 192/18 R X |

Primary Examiner—George H. Krizmanich
Attorney, Agent, or Firm—Quarles & Brady

[57] ABSTRACT

A clutch/brake apparatus for alternatively connecting a driven shaft to a driving member and to a stationary member which distributes the mass of its components to maximize the effective rotational inertia of the driving member and to minimize the effective rotational inertia of the driven shaft. Sets of interleaved brake plates are respectively mounted to the driven shaft and the stationary member and sets of interleaved clutch plates are respectively mounted to the driven shaft and the driving member. A clutch operator for urging the clutch plates together when it is moved in a first axial direction is connected to rotate with the driving member and a brake operator for urging the brake plates together when it is moved in a second axial direction is rotationally stationary and is connected by a bearing to move axially with the clutch operator. An actuator for moving the clutch and brake operators axially is connected to rotate with the driving member so that the effective mass of the driving member is maximized and the effective mass of the driven shaft is minimized.

8 Claims, 3 Drawing Figures

CLUTCH/BRAKE APPARATUS

BACKGROUND OF THE INVENTION

This invention relates to a combined clutch/brake apparatus and, more particularly, to a clutch/brake apparatus for use in a machine press or the like.

Combined clutch/brake apparatus are commonly used to drive or brake machinery such as machine presses. Such apparatus usually include a driving member, such as a flywheel, which is rotated by a prime mover such as an electric motor, a driven shaft of relatively low rotational inertia which drives the press reciprocally, a stationary member, normally disengaged clutch plates for connecting and disconnecting the driving member and the driven shaft, normally engaged brake plates for connecting and disconnecting the stationary member and the driven shaft, and an actuating apparatus, which may consist of an operator assembly and a piston actuator, for alternatively engaging and disengaging the clutch plates and the brake plates. To cycle the press, the actuating apparatus is triggered to cause the brake to disengage and the clutch to engage thereby disconnecting the driven shaft from the stationary member and connecting it to the driving member. Deactuating the actuating apparatus terminates cycling because the actuating apparatus causes the brake plates to engage and the clutch plate to disengage thereby connecting the driven shaft to the stationary member and disconnecting it from the driving member.

Starting and stopping the machine cycle may occur frequently, for example, during set-up or when the machine is being cycled through only one stroke at a time. Such frequent starting and stopping causes wear to the clutch/brake apparatus and especially to the clutch and brake plates. Also, every time the clutch is engaged, rotational energy is transferred from the driving member to the driven shaft thereby causing the driving member to decelerate, or slow down. The drive train must bring the driving member back up to speed after each time it slows down to keep its stored rotational energy as constant as possible. As a result, energy is expended each start/stop cycle of the drive train.

One way of minimizing the energy consumption and wear caused by starting and stopping the machine cycle is to arrange the clutch/brake components so as to maximize the effective mass of the driving member and to minimize the effective mass of the driven shaft. Maximizing the effective mass of the driving member maximizes its effective rotational inertia so that its momentum is maximized. Minimizing the effective mass of the driven shaft minimizes its effective rotational inertia so that the amount of energy which is required to accelerate and decelerate the driven shaft is minimized. Consequently, since less energy must be respectively transmitted and dissipated by the clutch and brake plates upon acceleration and deceleration of the driven shaft, clutch and brake plate wear is reduced. Also, since the momentum of the driving member is maximized and the rotational inertia of the driven shaft is minimized, slowdown of the driving member upon clutch engagement is minimized so that the energy that must be replenished by the prime mover is minimized.

However, known clutch/brake units do not include such arrangements. They either add to the effective rotational inertia of the driven shaft, as in U.S. Pat. No. 3,835,971 issued Sept. 17, 1974 to Spanke, et al., or lack arrangements which maximize the rotational inertia of the driving member as in U.S. Pat. No. 3,638,773 issued Feb. 1, 1972 to Lewis, et al. Therefore, it is desirable to provide a clutch/brake apparatus which minimizes the rotational inertia of the driven shaft and maximizes the rotational inertia of the driving member.

SUMMARY OF THE INVENTION

In accordance with the invention there is provided a clutch/brake apparatus for alternatively connecting a rotatably driven shaft to a driving member and to a stationary member. The apparatus includes a set of interleaved brake plates operatively connected to the driven shaft and the stationary member, a set of interleaved clutch plates operatively connected to the driven shaft and the driving member, an operator assembly which engages the clutch plates and disengages the brake plates when it is moved in one axial direction and which engages the brake plates and disengages the clutch plates when it is moved in the other axial direction, and an actuator for moving the operator assembly to alternatively engage and disengage the clutch and brake plates. The actuator is connected with the clutch operator of the operator assembly and both the actuator and the clutch operator rotate with the driving member. A brake operator is rotationally stationary relative to the stationary member and is connected to the clutch operator by a bearing which allows the clutch and brake operators to be rotationally independent but constrains them to move together axially.

In a clutch/brake apparatus in accordance with the present invention, the mass mounted on the driven shaft is minimized to minimize the driven shaft's effective rotational inertia. Also, the mass mounted on the driving member is maximized to maximize its effective rotational inertia. The invention thereby maximizes the amount of rotational energy stored by the driving member and minimizes the rotational energy necessary to be transmitted to and from the driven shaft to speed it up and slow it down, respectively. The effect of this is to provide for energy efficient operation of the clutch/brake apparatus and to reduce wear throughout the entire drive train.

It is a principal object of the invention to provide a clutch/brake apparatus which efficiently distributes the mass of its components between a driven shaft, a driving member and a stationary member.

It is another object of the invention to provide a clutch brake apparatus which reduces energy consumption and wear in the drive train of a machine press or the like.

The foregoing and other objects and advantages of the invention will appear in the following detailed description. In the description, reference is made to the accompanying drawings which illustrate preferred embodiments of the invention.

DETAILED DESCRIPTION OF THE PREFERRED EMBODIMENTS

Figure 1:
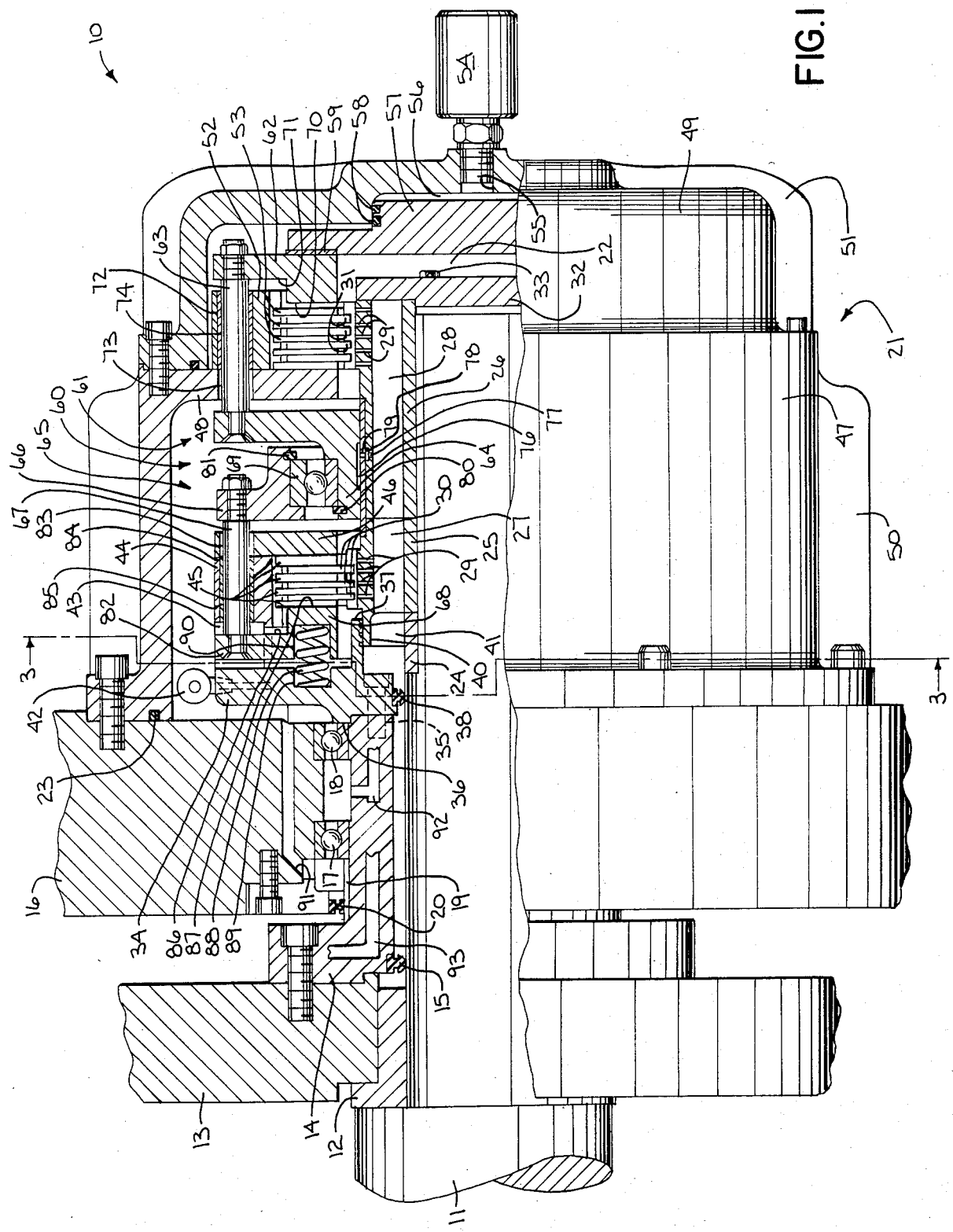
FIG. 1 is a view in elevation and partially in section of a clutch/brake apparatus in accordance with the present invention.

Referring to the drawings, a clutch/brake apparatus generally referred to as 10 has a driven shaft 11 journaled in an antifriction bearing 12 to rotate relative to a machine frame stationary member 13. The driven shaft 11 extends through a hollow quill shaft support 14 which is bolted to the stationary member 13 and is sealed against the shaft 11 by seal 15. The quill shaft support 14 mounts a flywheel driving member 16 on antifriction bearings 17 and 18, which are capable of bearing thrust and axial loads. Such bearings include the ball bearings shown, tapered roller bearings, and some types of hydrodynamic bearings. A shrink fitted spacer 19 abutting the inner race of the bearing 17 mates a seal 20 bolted to the flywheel driving member 16. A housing generally referred to as 21, defines a radial cavity 22 and is bolted to the flywheel driving member 16 and sealed thereto by an O-ring seal 23.

The driven shaft 11 extends into the radial cavity 22 and is shrink fitted, splined, pinned, keyed or otherwise securely attached to a spacer 24, a brake driven member 25, and a clutch driven member 26 to prevent rotation of the three aforementioned parts relative to the driven shaft 11. Since the spacer 24, the brake driven member 25 and the clutch driven member 26 all rotate together with the shaft 11, two or more of the aforementioned parts could be made in one piece as a single unit. Axially aligned oil passageways 27 and 28, respectively, extend through the brake and clutch driven members 25 and 26 and are in fluid communication by means of holes 29 with a first set of brake plates 30 and a first set of clutch plates 31. The brake and clutch plates 30 and 31 are made of a material which is suitable for transmitting the required torsional loads and are axially splined to the brake and clutch driven members 25 and 26, respectively, which splines allow the brake and clutch plates 30 and 31 to move axially but not rotationally relative to their respective brake and clutch driven members 25 and 26. An end plate 32 is bolted to the driven shaft 11 by bolts 33 and abuts the end of the clutch driven member 26 to apply in axial compressive force to the spacer 24 and the brake and clutch driven members 25 and 26 to insure against any movement of the three aforementioned elements relative to the driven shaft 11 or to each other. If the spacer 24 and/or the brake and clutch driven members 25 and 26 were made as a single unit as described in the previous paragraph, the shaft 11 could be extended slightly past the end of the clutch driven member 26 and a snap ring could be mounted on the shaft 11 adjacent to the end of the clutch driven member 26. This arrangement, among others, would also be adequate to retain the brake and clutch driven members 25 and 26 on the shaft 11.

The quill shaft support 14 extends slightly into the radial cavity 22 and is bolted to an annular mounting member 34 by cap screws 35 (shown by hidden lines). The mounting member 34 has an annular land 36 which abuts the inner race of the bearing 18. The mounting member 34 also has a close running seal portion 37 to seal the gap between the mounting member 34 and the brake driven member 25, and also mounts a seal 38 between itself and the shaft 11. The sealing portion 37 has a series of ridges which mate with an axially extending portion 40 of the brake driven member 25 to provide a seal and enclose a manifold chamber 41 which is in fluid communication with the oil passageways 27 and 28. A pitot tube oil pick-up 42 is mounted on the outer circumference of the mounting member 34 and is in fluid communication with the manifold chamber 41 by means of suitable oil passageways (not shown) in the mounting member 34.

The mounting member 34 includes an axially extending segmented sleeve portion 43 at its radially outer periphery. A first annular ring member 44 is bolted to the face of the segmented sleeve portion 43. A second set of brake plates 45 made of a suitable material is interleaved with the first set of brake plates 30 and is axially splined to the inside circumference of the ring member 44 to move freely axially but not rotationally. An annular brake plate stop 46 is bolted to the end of the ring member 44 opposite the sleeve portion 43 and abuts the end one of the second set of brake plates 45 opposite the mounting member 34.

The housing 21 includes an outer housing 47 which has a radially inwardly extending flange 48 and a cylinder housing 49 which is bolted and sealed to the outer housing 47. Ribs 50 and 51 are provided on both the outer and cylinder housings 47 and 49, respectively, to increase the surface area for heat dissipation. A second annular ring member 52 is bolted to the axially outer face of the flange 48. A second set of clutch plates 53 made of a suitable material is interleaved with the first set of clutch plates 31 and is axially splined to the inside circumference of the second ring member 52 to be axially but not rotationally movable relative to the second ring member 52. The radially inner periphery of the flange 48 abuts the end one of the second set of clutch plates 53 adjacent the flange 48.

A rotary seal inlet 54 is threaded into a tapped hole 55 in the right-hand end of cylinder housing 49 and is in fluid communication with a coaxial cylinder 56 defined by a recess in the inside wall of the cylinder housing 49. An actuator in the form of a piston 57 is freely slidable through all positions of operation in the cylinder 56 and sealed thereto by the O-ring seals 58. The outboard surface of the piston actuator 57 is recessed and mounts an annular resilient pad 59 which abuts one end of an operator assembly generally referred to as 60.

The operator assembly 60 has a clutch operator 61 which includes an annular clutch engaging arm 62, a plurality of first linkage rods 63 and an annular first bearing member 64. The operator assembly also has a brake operator 65 which includes an annular second bearing member 66, a plurality of second linkage rods 67, and an annular brake engaging arm 68. An antifriction bearing 69 which is capable of transmitting thrust loads connects the clutch operator 61 to the brake operator 65. The clutch engaging arm 62 has a clutch engaging face 70 opposite the face abutting the resilient pad 59, and a recess 71 adequate to clear the second ring member 52 in all positions of operation. The first linkage rods 63 pass through axially aligned holes 72 and 73 in the second ring member 52 and the flange 48, respectively. Bushings 74 between the rods 63 and the second ring member 52 allow the rods 63 to slide axially. Holes 73 are sized to provide clearance between the rods 63 and the flange 48. The ends of the rods 63 extend beyond the flange 48 and are securely fastened to the first bearing member 64 by a plurality of flathead screws or other appropriate means. The opposite ends of the first linkage rods 63 are firmly affixed to the arm 62 by nuts or other appropriate means. The distance between the flange 48 and the bearing member 64 allows the operator assembly 60 to move freely axially through all positions of operation. The bearing member 64 is journaled on a bushing 76 so that it can rotate and move axially relative to the brake and clutch driven members 25 and 26. Holes 77 and an annular channel 78 in the clutch driven member 26 and holes 79 in the bushing 76 are in fluid communication with oil passageway 28. The inner race of the bearing 69 is mounted in a recess in the radially outer periphery of the bearing member 64 and is restrained axially by a snap ring 80.

Figure 3:
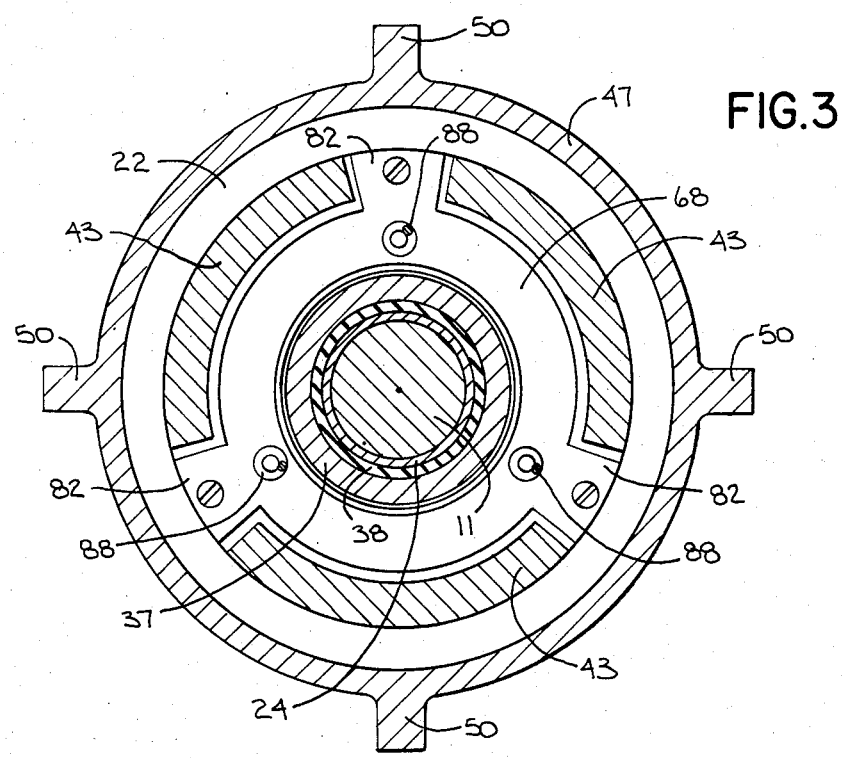
FIG. 3 is a view in section of the clutch/brake apparatus of FIG. 1 as viewed from the plane of the line 3—3 of FIG. 1.

The outer race of the bearing 69 is mounted in a recess in the radially inner periphery of the second bearing member 66 and is axially restrained by a snap ring 81. The second linkage rods 67 are likewise secured by appropriate means to the second bearing member 66 and to fingers 82 of the brake engaging arm 68. The fingers 82 are equally spaced and are received in recesses in the segmented sleeve portion 43 of the mounting member 34 (see FIG. 3). The linkage rods 67 extend through axially aligned holes 83 and 84 in the brake plate stop 46 and the first ring member 44, respectively. Bushings 85 between the rods 67 and the first ring member 44 allow the rods 67 to slide axially. The holes 83 are sized to provide clearance between the rods 67 and the brake plate stop 46. The distances between the brake plate stop 46 and the first and second bearing members 64 and 66 are such that the operator assembly 60 can move freely throughout all positions of operation. The brake engaging arm 68 has a recess 86 adequate to clear the first ring member 44 in all positions of operation and a brake engaging face 87 adjacent the brake plate on the end of the second set of brake plates 45 opposite the brake plate stop 46. The distance from the brake engaging arm 68 to the mounting member 34 is adequate to avoid abutment of the arm 68 with the mounting member 34 through all positions of operation. A plurality of compression springs 88 between the mounting member 34 and the brake engaging arm 68 in bores 89 and 90, respectively, bias the operator assembly 60 to urge the first and second sets of brake plates 30 and 45 to be normally engaged and the first and second sets of clutch plates 31 and 53 to be normally disengaged.

In operation, the flywheel driving member 16 is driven by a prime mover, such as an electric motor (not shown), and, because of its relatively great mass, stores considerable rotational energy. The housing 21, the piston actuator 57, the second ring member 52, the second set of clutch plates 53 and the clutch operator 61 all rotate with the flywheel 16 thereby effectively adding to its mass and to the rotational energy stored. The brake operator 65 is stationary with respect to the quill shaft support 34 and therefore the stationary member 13 so that no portion of the operator assembly 60 or the piston actuator 57 rotates with the driven shaft 11. Such an arrangement advantageously maximizes the effective rotational momentum of the flywheel driving member 16 and minimizes the effective rotational inertia of the driven shaft 11.

Assuming the clutch/brake apparatus is in the normally brake condition as shown in FIG. 1, when hydraulic fluid from an external pressure source (not shown) is introduced into the cylinder 56 through the rotary seal inlet 54, it will act on the piston actuator 57 to urge the operator assembly 60 in a first axial direction toward the flywheel to thereby engage the clutch plates 31 and 53 and disengage the brake plates 30 and 45. Since the effective rotational momentum of the flywheel driving member 16 is maximized, slow-down of the flywheel 16 upon clutch engagement is minimized and since the effective rotational inertia of the driven shaft 11 is minimized, the energy required to be transmitted by the clutch plates 31 and 53 to bring the driven shaft 11 up to speed is minimized. Likewise, when the hydraulic pressure is relieved, the springs 88 urge the operator assembly 60 in a second axial direction opposite to the first axial direction to engage the brake plates 30 and 45 and disengage the clutch plates 31 and 53. Since the effective rotational inertia of the driven shaft 11 is minimized, the rotational energy required to be dissipated by the brake plates 30 and 45 to slow the shaft 11 to a halt is minimized.

The radial cavity 22 is fluid tight so that it can be filled with a cooling and lubricating oil. Pilot tube pick-up 42 faces opposite to the direction of rotation to fully employ the dynamic and centrifugal pressure of the rotating oil to direct oil to the brake and clutch plates and to the bushing 76 via suitable oil passageways including the manifold chamber 41, oil passageways 27 and 28, holes 29, 77 and 79 and annular channel 78 for added cooling and lubrication. Oil passageways 91 and 92 are provided in the flywheel 16 and the quill shaft support 14, respectively, to provide oil to and from the bearings 17 and 18. Suitable oil passageways 93 can provide a flow of oil to and from an external source (not shown) so as to be in communication with the pitot tube pick-up 42 and manifold chamber 41 to help carry away the extreme heat produced by braking and clutching in those applications where external cooling is necessary.

Figure 2:
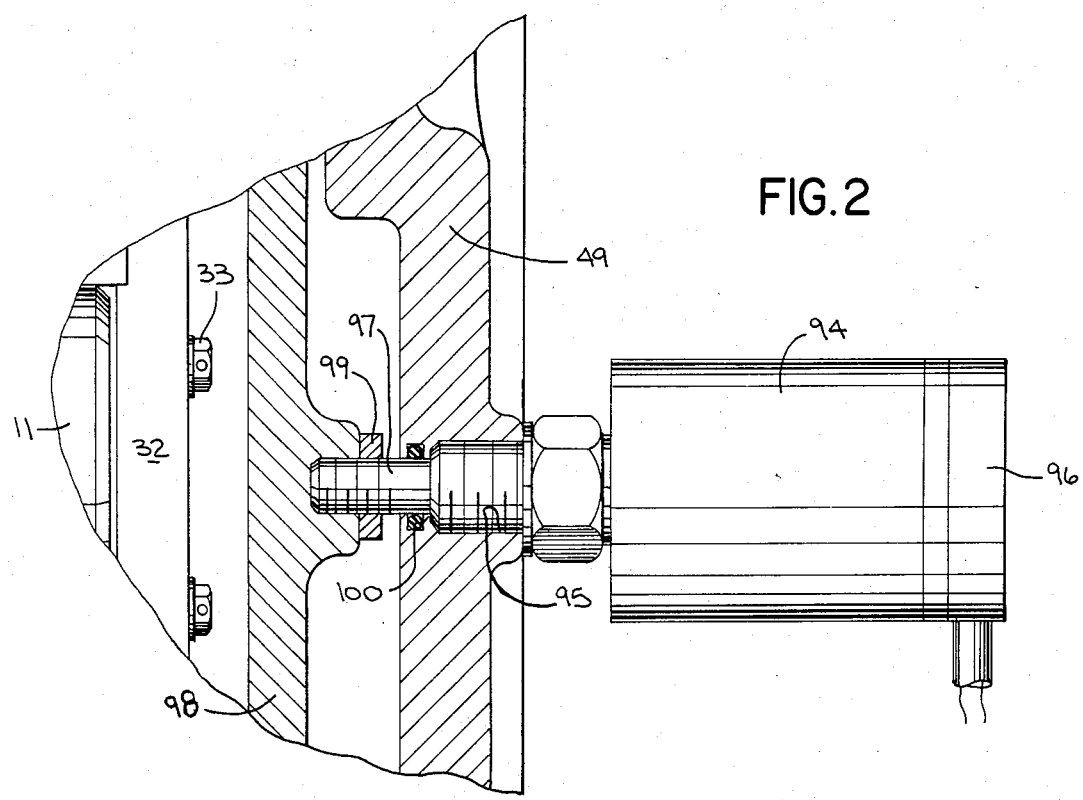
FIG. 2 is a fragmentary view in elevation of an electrically actuated embodiment of the invention.

Numerous modifications to and variations of the present invention will be apparent to those skilled in the art. One example is that the fluid used to actuate the piston actuator 57 of the embodiment of FIG. 1 need not be oil, but could be air supplied by an external pressure source. Another example is shown in FIG. 2 in which the operator assembly is triggered electrically rather than hydraulically. A solenoid actuator 94 or other suitable electrical actuator is threaded into a hole 95 and rotates with the housing 21. The actuator 94 has a rotary connector 96, and a plunger 97 which is threaded into an actuator disc 98 and locked in place by a lock nut 99. An O-ring seal 100 keeps oil from leaking into the actuator 94. When the actuator 94 is energized, the actuator disc 98 moves the operator assembly 60 in the first axial direction in the same way as the piston actuator 57 of FIG. 1.

Another modification which will be apparent to those skilled in the art is that the operator assembly 60 could be spring biased in either the first or the second direction and hydraulically, electrically, or otherwise moved in the opposite direction. Also, of course, the operator could be hydraulically, electrically or otherwise moved in both directions.

What is claimed is:
1. A clutch/brake apparatus for alternatively clutching and braking a driven shaft and to be mounted on a machine frame stationary member, comprising:
   a quill shaft support mounted to said machine frame stationary member and having said driven shaft extending therethrough;
   a fly wheel driving member journaled on said quill shaft support;
   a rotatable housing connected for rotation with said fly wheel driving member and having a radial cavity into which said quill shaft support and said driven shaft extend;

a first set of brake plates in said radial cavity operatively connected to said driven shaft to rotate therewith;

a second set of brake plates in said radial cavity interleaved with said first set of brake plates and operatively connected to said quill shaft support to be rotationally stationary with respect thereto;

a first set of clutch plates in said radial cavity operatively connected to said driven shaft for rotation therewith;

a second set of clutch plates in said radial cavity interleaved with said first set of clutch plates and operatively connected to said rotatable housing for rotation therewith;

an operator assembly for engaging said clutch plates and disengaging said brake plates when said operator assembly is moved in a first axial direction and for disengaging said clutch plates and engaging said brake plates when said operator assembly is moved in a second axial direction opposite to said first axial direction, comprising:

a brake operator connected to be rotationally stationary with respect to said quill shaft support for urging said brake plates together when said operator assembly is moved in said second axial direction;

a clutch operator connected for rotation with said rotatable housing for urging said clutch plates together when said operator assembly is moved in said first axial direction;

a bearing for connecting said clutch operator to said brake operator so that said clutch and brake operators are rotationally independent but are constrained to move together axially;

a compression spring for biasing said operator assembly to cause said brake plates to be normally engaged and said clutch plates to be normally disengaged; and an actuator connected for rotation with said rotatable housing to urge said operator assembly against the force exerted by said compression spring to cause said clutch plates to move into engagement and said brake plates to move out of engagement.

2. The clutch/brake apparatus of claim 1, wherein said actuator comprises a hydraulically actuated piston.

3. The clutch/brake apparatus of claim 2 further comprising a rotary seal inlet for rotatably supplying hydraulic fluid under pressure to act on said hydraulically actuated piston.

4. The clutch/brake apparatus of claim 1, wherein said actuator comprises an air actuated piston.

5. The clutch/brake apparatus of claim 4, further comprising a rotary seal inlet for rotatably supplying air under pressure to act on said air actuated piston.

6. The clutch/brake apparatus of claim 1, wherein said actuator comprises electrically actuated means for moving said operator assembly axially.

7. The clutch/brake apparatus of claim 6, further comprising a rotary connector for connecting said actuator to a control circuit.

8. A clutch/brake apparatus for alternatively connecting a rotatably driven shaft to a driving member and a stationary member, comprising:

clutch plates operatively connected respectively to the driven shaft and to the driving member;

brake plates operatively connected respectively to the driven shaft and to the stationary member;

a clutch operator for urging said clutch plates together when said clutch operator is moved in a first axial direction, said clutch operator being connected to rotate with said driving member;

a brake operator for urging said brake plates together when said brake operator is moved in a second axial direction, said brake operator being connected to be rotationally stationary with respect to said stationary member;

an actuator for moving said clutch and brake operators in said first axial direction, said actuator being connected to rotate with said driving member so that said actuator and said clutch operator add to the effective rotational inertia of said driving member and said brake operator does not add to the effective rotational inertia of said driven shaft; and means for biasing said clutch and brake operators in said second axial direction so that said brake plates are normally engaged and said clutch plates are normally disengaged.

* * * * *